United States Patent [19]

Malone et al.

[11] Patent Number: 4,894,505
[45] Date of Patent: Jan. 16, 1990

[54] MODIFIED ROTATING REUSABLE PREFORM

[75] Inventors: Gregory D. Malone, Powell; Michael D. McAninch; Patrick M. Ryan, both of Alliance, all of Ohio

[73] Assignee: The Babcock & Wilcox Company, New Orleans, La.

[21] Appl. No.: 288,587

[22] Filed: Dec. 22, 1988

[51] Int. Cl.4 .................................................. B23K 9/04
[52] U.S. Cl. ............................... 219/76.11; 219/76.14; 228/222
[58] Field of Search ................. 219/76.1, 76.11, 76.14; 228/222, 242, 46

[56] References Cited

U.S. PATENT DOCUMENTS 4,621,762 11/1986 Bronowski ........................ 219/76.11
4,775,092 10/1988 Edmonds et al. ................. 219/76.11
4,842,186 6/1989 Doyle et al. ........................ 219/76.1

Primary Examiner—Clifford C. Shaw
Attorney, Agent, or Firm—Vytas R. Matas; Robert J. Edwards; Daniel S. Kalka

[57] ABSTRACT

An apparatus for building an axially symmetrical workpiece of desired geometry by deposit welding which uses a welding head 18 for depositing molten weld material 14 and a rotatable, reusable preform 10 which translates with the welding head 18. The reusable preform 10 is provided with means for varying its shape 22 to minimize the weight of the preform 10. The rotatable, reusable preform 10 forms, supports and cools the deposited molten weld puddle 14 while the weld material is solidifying thereby eliminating the need for a conventional consumable preform.

15 Claims, 2 Drawing Sheets

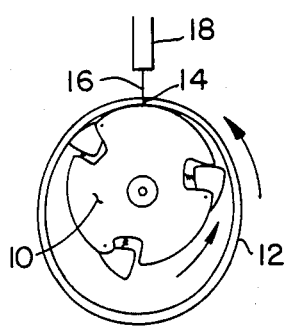
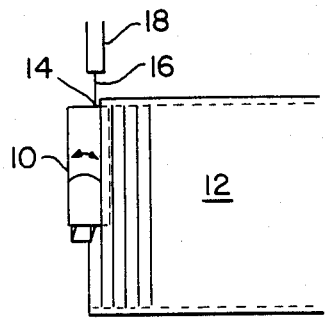
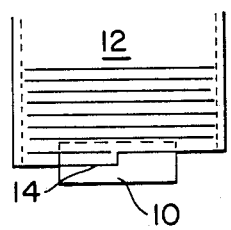
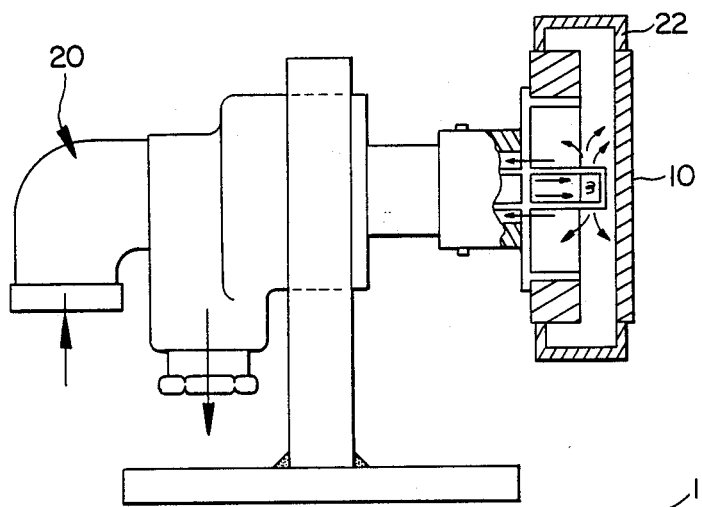
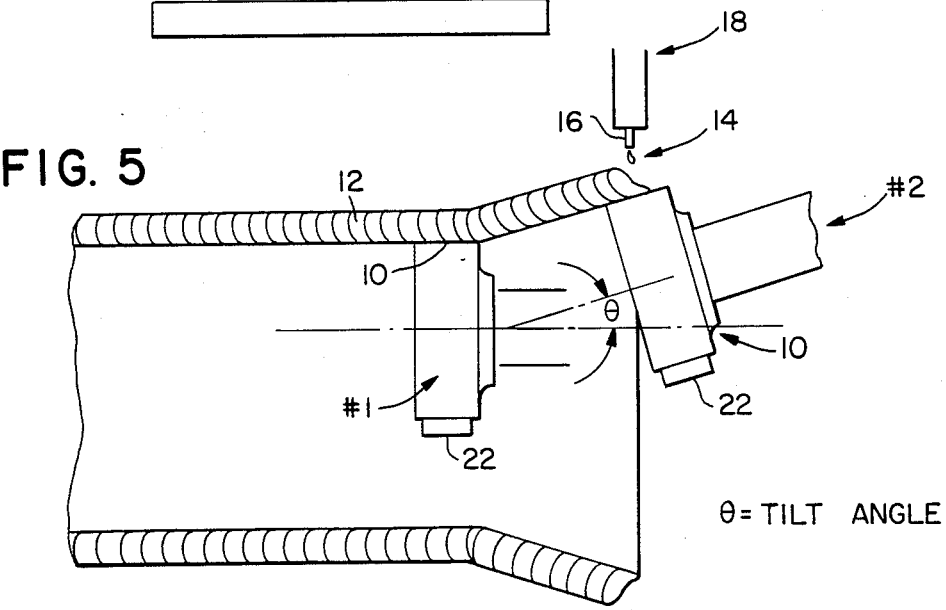
θ = TILT ANGLE

MODIFIED ROTATING REUSABLE PREFORM

BACKGROUND OF THE INVENTION

The present invention relates generally to an apparatus for building a workpiece by deposit welding, and more particularly, to a rotating reusable preform for use in the shape melting welding process.

DESCRIPTION OF THE RELATED ART

Shape melting is a process whereby structural components are manufactured by depositing weld material layer-upon-layer until the desired geometry is achieved. This process offers the advantage of delivering a near-net-shape product which can be produced quickly and economically using both ferrous and non-ferrous materials.

U.S. Pat. No. 2,299,747 to Harter is directed in part to a method for forming structures wholly of fusion deposited weld metal by the arc process in successive intersecting fusion beads along a non-adherent base. A similar method is described in U.S. Pat. No. 2,912,562 to Donovan which disclosure is directed to reconditioning cylinder liners for diesel engines. The concept of forming a cylinder made up solely of welded material progressively deposited in molten form is disclosed in U.S. Pat. No. 3,558,856 to Ujiie. Million, et al, U.S. Pat. No. 4,517,434 relates to deposit welding to make a tube bend built up by a plurality of weld sections. Additionally known from U.S. Pat. No. 4,621,762 to Bronowski is the buildup of a workpiece by deposit welding using form shoes cooled by water. Along the same general lines as Ujiie, U.S. Pat. No. 4,671,448 to Million, et al describes a method of forming an element having a symmetrically curved surface by means of weld build-up and rotation of the work.

Automation and computer control can be integral parts of the shape melting process. The use of automation allows for maximum flexibility of the production station. This flexibility permits any number of different products to be manufactured without extensive retooling. Retooling in this case would be, for the most part, changing the controlling software which dictates the sequence, welding parameters, and position of welds necessary to achieve the desired final product.

Almost every facet of shape melting can involve computer control. In the incipient stages of a project, design aspects would be subject to computer analysis. The results of these analyses would then be incorporated into the functions which control automation.

Implicit in the use of the above controls is the ability to deliver a final product with tailored mechanical, corrosion, and physical properties. This comes about because these properties are strongly tied to the interrelated functions of weld heat input, cooling rate, bead size, bead shape, bead sequence, and bead position. If, in addition to the above variables, one also permits controlled composition variation throughout the product, it is possible, if appropriate control is exercised, for the product to have the desired combination of strength, toughness, hardness, or corrosion resistance at critical points in the product.

Weld build-up operations like shape melting require a conventional preform which is generally a machined piece of metal onto which the first layer of the build-up is deposited. It is termed a "preform" because its formed or machined shape reflects an intended final shape of the build-up.

A conventional preform serves as the support for the molten as-deposited weld metal, as the conduit for conduction cooling of the freshly deposited weld metal, as the means for restraining weld contraction stresses thereby limiting distortion of the build-up, and as the general cross-sectional shape for the weld build-up, e.g. a cylindrical build-up would require a cylinder as the starting preform.

Virtually all weld build-ups require some form of preform for any or all of the purposes stated above. In almost every instance, the surface of the conventional preform is melted by the heat of the welding arc. This melting of the surface results in a detrimental bonding of the conventional preform to the weld build-up. Further, unless the conventional preform has the same composition as the weld filler material, surface melting of the conventional preform will result in the initial layers of the build-up having a composition which includes some melted conventional preform material.

If the aforementioned composition variations is objectionable, it will be necessary to machine away the conventional preform and as many layers of the build-up as necessary to achieve an acceptable weld metal composition throughout. This loss of material and increased production time negatively impacts the economy of shape melting. As was mentioned earlier, another purpose associated with the use of a conventional preform, is that the conventional preform usually must be machined to an initial desired geometry. This implies expenses both in materials and machining time prior to shape melting. Thus, in summary, if the need for a conventional preform can be eliminated, the costs associated with both the initial and final stages of shape melting manufacturing can be reduced.

U.S. patent application Ser. No. 07/209,160, filed June 20, 1988, now U.S. Pat. No. 4,842,186 is a continuation-in-part of U.S. patent application Ser. No. 07/115,131 filed Oct. 30, 1987 now U.S. Pat. No. 4,775,092. Both of these patent applications disclose reusable preforms for building a workpiece by deposit welding.

As described in those applications, there is a lower and upper limit for a given application on the radius of a rotating cylindrical reusable preform device. The lower limit is defined by the ability of the shoe to support and control the shape of the weld pool. The upper limit radius is defined by the inside diameter of the component being fabricated. This results in a very large and heavy preform device when fabricating large radius components.

The increase in preform weight can inhibit flexible manufacturing methods where a robot is used to support and move the preform device. The weight limitations of the robot arm or other support fixtures prohibits the fabrication of large diameter shape melted components with a rotating cylindrical reusable preform.

SUMMARY OF THE INVENTION

The present invention is directed to a rotating, reusable preform that provides the same relationship between the relative radius of the preform as described in U.S. patent application Ser. No. 07/115,131 filed Oct. 30, 1987, while minimizing the weight of the rotating reusable preform.

The rotating, reusable preform of the present invention, as in the aforementioned co-pending applications, eliminates the need for a conventional preform in the creation of workpieces made entirely from deposited weld metal. It provides the underlying form, necessary puddle support, and cooling for the weld metal as it is deposited and solidifies. An additional feature of the present invention is the ability of the rotating, reusable preform to vary its radial size so as to accommodate the fabrication of large radius components.

Accordingly, one aspect of the present invention is an apparatus for building a workpiece by deposit welding, comprising a welding head for depositing molten weld material; a rotatable, reusable preform for forming, supporting, and cooling the molten weld material deposited directly on the surface thereof; means for varying the shape of the preform; and means for moving the workpiece so as to continuously provide a new region of the preform underneath the welding head to cool the molten weld material as it is deposited.

An advantage of the present invention is the capability of fabricating large radius workpieces while minimizing the weight of the rotating, reusable preform, and at the same time, maximize the surface contact area in the region of weld metal deposit.

Other advantages of the present invention are immediately apparent. By providing a reusable preform that eliminates the need for a conventional, consumable preform, the production costs associated with machining a conventional preform to a desired initial geometry for each workpiece to be manufactured are greatly reduced. Similarly, by preventing the reusable preform from melting in the welding arc, as is the situation when a conventional disposable preform is used, no bond forms between the preform and the deposited weld metal. Thus there is eliminated contamination of the layers of the as-deposited weld metal and the subsequent machining usually required.

The various features of novelty which characterize the invention are pointed out with particularity in the claims annexed to and forming a part of this disclosure. For a better understanding of the invention, and the operating advantages attained by its use, reference is made to the accompanying drawings and descriptive matter in which a preferred embodiment of the invention is illustrated.

BRIEF DESCRIPTION OF THE DRAWINGS

In the drawings:

FIG. 1 is a top view of the shape melting apparatus of the present invention;

FIG. 2 is an end view of FIG. 1, showing the shape melting apparatus of the present invention;

FIG. 3 is a side view of FIG. 2, showing the shape melting apparatus of the present invention;

FIG. 4 is an illustration of a fluid cooled reusable preform, partly in section, according to the present invention shown mounted on a rotary coupling;

FIG. 5 is an illustration of a variable tilt angle of the reusable preform so as to achieve a variable workpiece geometry;

DESCRIPTION OF THE PREFERRED EMBODIMENT

Figure 6:
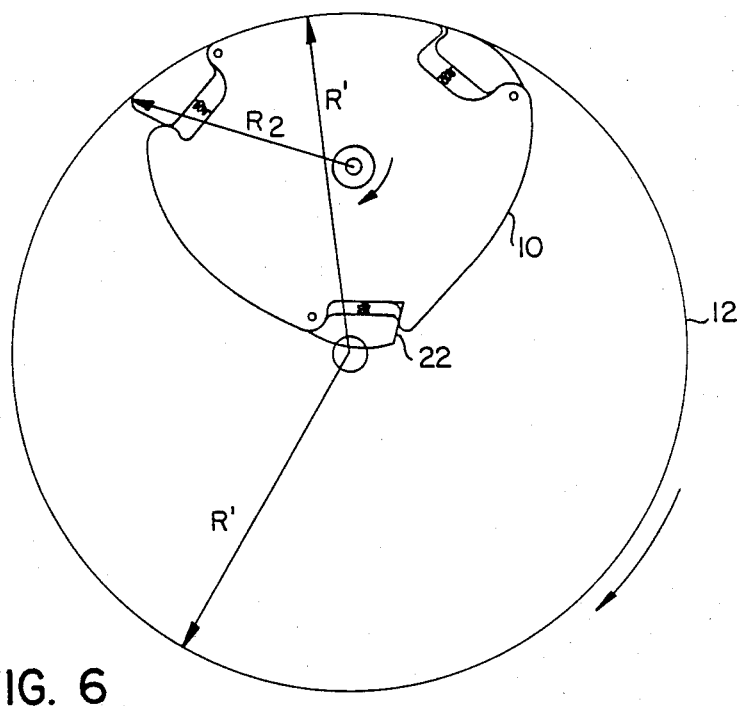
FIG. 6 is an end view of the rotatable, reusable preform of the present invention depicting R' and $R_2$.

Referring to the Figures generally, wherein like numerals designate the same element throughout the several drawings, the present invention is directed to a rotatable, reusable preform 10 which provides the cooling, shaping, and support functions of a preform without being consumed. In operation, the rotatable, reusable preform 10 is in close contact with the workpiece 12. The contact point 14 coincides with the point of weld metal deposition. An arc deposits metal between the consumable wire 16 and the edge of the existing workpiece 12. The initial metal deposition occurs on the edge of a disposable metal starting stock. The rotatable, reusable preform 10 is electrically isolated from the welding circuit, so that the arc is not drawn to it. The arc simultaneously melts a small region at the edge of the workpiece 12 and begins deposition of molten droplets 14 of the consumable wire 16. Contact of the rotatable, reusable preform 10 under the deposition region is controlled in such a way as to support all the molten material which is generated and to provide a means to aid in the cooling of the hot metal. In this way, the surface of the rotatable, reusable preform 10 defines the internal surface of the shape melted product.

The rotatable, reusable preform 10, is for use in the build-up of axially symmetrical components. For this function, it takes the form of a wheel with a plurality of sides. The preferred embodiment as illustrated in FIG. 6 has three sides. Both the external radius ($R_2$) and the effective radius of each side (R') of the rotatable, reusable preform 10 is less than the internal radius of the workpiece 12. The present invention is unlike the reusable preform in U.S. patent application Ser. No. 07/115,131 filed Oct. 30, 1987, where there is a preform weight limitation based on the lower and upper radius limits on the preform device when fabricating large diameter components. The lower limit radius is defined by the ability of the reusable cylindrical preform to support and control the shape of the weld puddle. The upper limit radius is defined by the inside diameter of the component being fabricated. This results in a very large and heavy preform device when fabricating large components. This increase in the weight of the reusable preform can inhibit flexible manufacturing methods, for example, where a robot is used to support and move the preform device. The weight limitations of robot arm or other support fixtures can prohibit the fabrication of large diameter shape melted components using a cylindrical reusable preform.

The modified rotating reusable preform 10 provides the same relationship between the relative radius of each side of the preform device and the shape melting component, but minimizes the weight of the reusable preform.

The modified rotating reusable preform 10 as illustrated in FIG. 6 has a plurality of sides, preferably three sides. It is further provided with means for varying its outside dimension or shape. In FIG. 6, the varying means includes a spring-loaded flap 22 located at each corner of the preform 10. Of course, flaps 22 are operable with any resilient means that urge them outwards, such as, a hydraulic cylinder for example. The preform device is designed such that the effective surface radius of each side (R') is less than the internal radius of the workpiece 12. It is also designed such that the maximum radius of the preform ($R_2$) is less than that of the cylindrical preform having a radius equal to R', thereby providing the same relationship between the workpiece 12 and each side of the preform while minimizing its overall size and weight.

Flaps 22 have a radius surface profile which assists in transitioning from one side to the next. In the preferred embodiment, flaps 22 are water-cooled.

In application, the rotatable, reusable preform 10 is preferably driven by friction contact with the workpiece 12. Contact between the reusable preform 10 and the workpiece 12 is maintained by the adjustable vertical position of the cantilevered reusable 10. Mechanical rotation of the workpiece 12 drives the rotation of the shoe.

Figure 7:
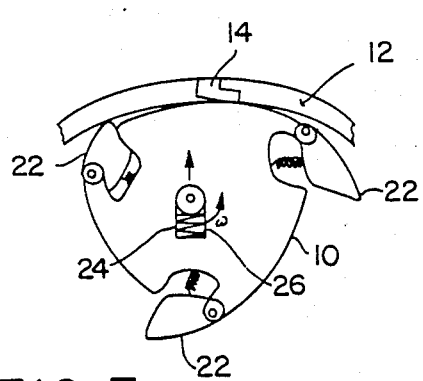
FIG. 7 is an end view of an alternate embodiment the present invention supporting a weld pool on one of its sides while fabricating a cylindrical workpiece.
Figure 8:
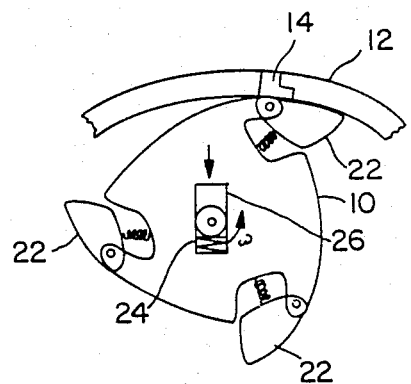
FIG. 8 is similar to FIG. 7 except that it illustrates a flap coming into position.

In an alternate embodiment, the preform 10 is preloaded against the workpiece 12 by spring-loading 24 or automatic adjusting vertical slide. For example, FIG. 7 illustrates the spring 24 expanded in center slot 26 exerting an upward force as indicated by the arrow up against the workpiece 12. FIG. 8 depicts the spring 24 in its contracted state in center slot 26. As the flap 22 comes into position the force generates a downward thrust so as to contract spring 24 in center slot 26 as indicated by the arrow.

Figure 9:
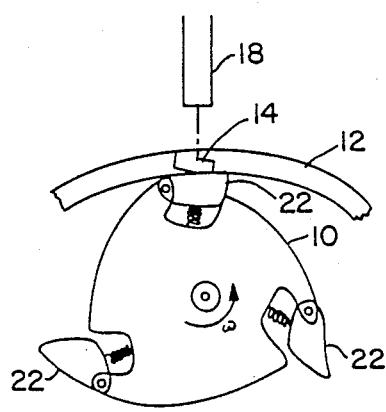
FIG. 9 illustrates an embodiment of the present invention as the weld pool is supported by the flap.
Figure 10:
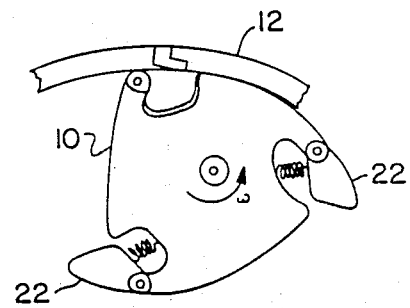
FIG. 10 is similar to FIG. 9 except that it depicts the flap fully compressed as it supports the weld bead while a transition is made to the next side of the preform.

FIG. 7 also depicts how the weld pool is supported by one of three sides. FIG. 8 also shows a flap 22 coming into position as the reusable preform rotates as indicated by the arrow (w). As flap 22 comes into position, it completely supports the weld pool at the contact point 14. The flap 22 is being compressed as the workpiece 12 rotates as is shown in FIG. 9. When the flap 22 is fully compressed, it still supports the weld bead as the transition is made to the next side of the reusable preform 10, as is illustrated in FIG. 10.

The welding head 18 is translated along the axis of the workpiece 12. This combination of mechanical rotation and weld head translation continuously provides a new region for deposition under the welding head 18. In this way, material is deposited in a helical or stepped fashion along the axis of the workpiece 12. In order to present a consistent reusable preform surface under the deposited material, the reusable preform 10 must be translated in conjunction with the welding head 18. The previously mentioned rotation of the reusable preform 10 is desired so that a fresh cooler preform surface is continuously available to cool the newly deposited material 14. This continuous rotation makes it less likely that the reusable preform 10 will become hot enough in a localized area to melt and be consumed in the welding arc. Alternatively, rotation of the reusable preform 10 could be provided by an independent drive means (not shown) to insure constant and steady rotation during the application of the deposited weld metal to the workpiece 12.

To provide further assurance that the reusable preform 10 will not melt, it is manufactured from a high conductivity material, e.g. copper. A ceramic coating on the surface can also provide electrical isolation. As alternative embodiments either the entire reusable preform 10 could be made from ceramic material or portions of it such as the flaps 22. Additionally, the reusable preform 10 is hollow in design, as illustrated in FIG. 4, to provide an access for internal cooling using a fluid. This cooling of the reusable preform 10 is accomplished by continuously renewed cooling fluid which is circulated through the reusable preform 10 with the aid of a rotary coupling mechanism 20. A sufficiently high flow rate of cooling fluid is maintained to hold the reusable preform 10 at a consistently low temperature, thereby providing the dual benefits of providing a means to cool the deposited metal 14 and further minimizing the possibility of melting the reusable preform 10.

The cross section of the resulting workpiece 12 can be controlled by controlling the angle between reusable preform surface 10 and the workpiece 12. Referring to FIG. 5, if it is desired to vary the internal diameter of the workpiece 12, the desired result could be accomplished by tilting the reusable preform 10 to achieve the new desired geometry. Thus, an additional mechanism is provided to tilt the reusable preform 10 to any desired angle while maintaining rotation, translation, and internal cooling capabilities. This same reusable preform tilting capability can also be used to accommodate and correct for changes in the product-geometry due to shrinkage strains.

While a specific embodiment of the invention has been shown and described in detail to illustrate the application of the principles of the invention, certain modifications and improvements will occur to those skilled in the art upon reading the foregoing description. It is thus understood that all such modifications and improvements have been deleted herein for the sake of conciseness and readability but are properly within the scope of the following claims.

One example of such a modification to the reusable preform 10 includes solid flaps 22.

We claim:

1. An apparatus for building a workpiece by deposit welding, comprising:
    a welding head for depositing molten weld material;
    a rotatable, reusable preform for forming, supporting, and cooling the molten weld material deposited directly on the surface thereof;
    means for varying the shape of rotatable, reusable preform; and
    means for moving the workpiece which continuously provides a new region of said rotatable, reusable preform surface underneath said welding head.

2. An apparatus according to claim 1, wherein said rotatable, reusable preform has a plurality of sides having an effective radius R' and an overall radius of $R_2$, where $R_2$, is less than or equal to that of a cylindrical preform having a radius equal to R'.

3. An apparatus according to claim 2, wherein said varying means includes flaps at the corner of each of said sides of said rotatable, reusable preform.

4. An apparatus according to claim 3, wherein said flaps are spring-loaded.

5. An apparatus according to claim 4, wherein said rotatable, reusable preform includes an internal passage.

6. An apparatus according to claim 5, further including means for cooling said hollow preform by circulating a cooling fluid therethrough so as to consistently cool the deposited molten weld material and to prevent melting of said preform.

7. An apparatus according to claim 6, wherein said flaps are water cooled.

8. An apparatus according to claim 7, wherein said rotatable reusable preform is manufactured from a high conductivity material.

9. An apparatus according to claim 8, wherein said high conductivity material is copper.

10. An apparatus according to claim 8, wherein the rotatable reusable preform includes means for electrically isolating said welding head so that the welding arc is not drawn to said preform.

11. An apparatus according to claim 10, wherein said isolating means is ceramic.

12. An apparatus according to claim 11, wherein said ceramic is about 70% silicon nitride and about 30% boron nitride.

13. An apparatus according to claim 10, further comprising means for varying the tilt angle between said rotatable, reusable preform and the workpiece so as to vary the geometry of the workpiece.

14. An apparatus according to claim 13, wherein said rotatable, reusable preform is in friction contact with the workpiece.

15. An apparatus according to claim 14, further comprising means for translating said preform and said welding head together for continuously providing a new fresh region of the preform surface to consistently cool the molten weld material as it is deposited thereon.

* * * * *